United States Patent Office 3,114,619
Patented Dec. 17, 1963

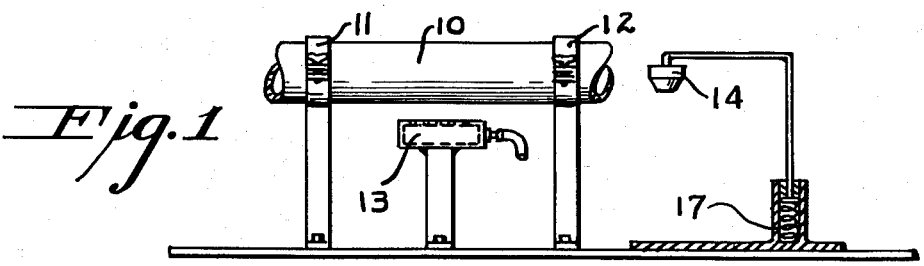
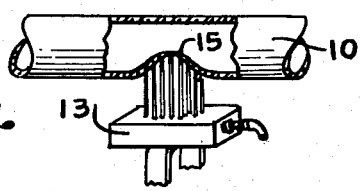
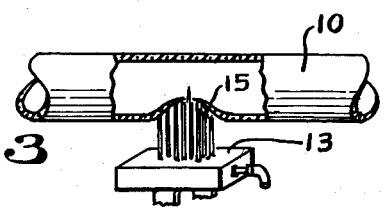
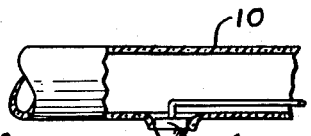
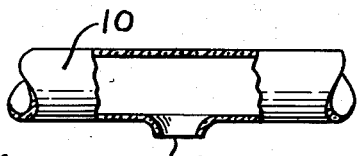

3,114,619
FORMING HOLES IN GLASS OBJECTS
Joseph E. Nitsche, Corning, and Roy E. Smith, Horseheads, N.Y., assignors to Corning Glass Works, Corning, N.Y., a corporation of New York
Filed Nov. 3, 1961, Ser. No. 150,082
12 Claims. (Cl. 65—113)

This invention relates to methods and apparatus for forming holes in glass objects. The invention is particularly useful for forming in glass pipe holes with flat openings of circular or elliptical form adapted to be sealed directly to the ends of other pieces of glass pipe to form intercommunicating channels in the form of T's or Y's.

Although the invention will be described with reference to forming holes in glass pipe, it will be apparent that the invention is equally applicable to the forming of holes in glass objects of various configurations.

A convenient method for joining two pieces of glass pipe is to cut a first piece of pipe along the intersection of the pipe with a plane which forms with the axis of the pipe an angle identical to that which it is desired to have between the axes of the two pieces of pipe after they have been joined. If a hole is then produced in the side of a second piece of pipe in the form of a plane curve which is similar to that produced in the end of the first, and if the plane of the curve is parallel to the axis of the second pipe and the curve is oriented so that the axes of the two pieces of pipe intersect when the two pieces are brought together so that the two curves coincide, then the two pieces can be simply juxtaposed and their abutting surfaces sealed by the application of heat or by other conventional means.

In the past such holes have been produced either by heating a portion of the pipe and mechanically punching a hole in the heated portion or by heating a portion, plugging one end of the pipe, and subsequently blowing air inside the pipe to force the heated portion outward to form an opening and subsequently hand-tooling the opening. Each of these methods is slow and produces holes of less uniformity than those produced by the present method.

It is, accordingly, an object of this invention to provide a method for the convenient production of such openings in the sides of pieces of glass pipe not having the disadvantages of previous methods.

This object is accomplished, according to one embodiment of the invention, by supporting a piece of glass pipe with its axis horizontal, directing the flames from a high velocity gas burner against an elongated area along the bottom outer surface of the pipe until a bubble is produced which projects into the interior of the pipe until it bursts and then falls back under the force of gravity, and subsequently forcing a plunger vertically downward from the interior of the pipe and into the opening thus produced to form it to the desired shape.

The invention can be understood by reference to the following drawing, in which:

FIGURE 1 illustrates one form of apparatus utilized in the invention,

FIGURE 2 illustrates the manner in which the burner shown in FIGURE 1 forms in the bottom surface of the pipe a bubble which projects into the pipe, FIGURE 3 illustrates the bubble immediately after bursting, FIGURE 4 illustrates the position to which the bubble of FIGURE 3 sags under the force of gravity, FIGURE 5 illustrates the final shaping of the hole by the plunger, and FIGURE 6 illustrates the pipe having a completed hole therein.

In FIGURE 1, glass pipe 10 is supported by clamps 11 and 12. Gas-oxygen burner 13 is positioned directly beneath pipe 10. Plunger 14 is slidable along a track which permits it to be moved within the interior of pipe 10 and pressed downward by compression of spring 17 to impart the final shape to the hole.

The effects of the burner on the pipe are illustrated in FIGURES 2 and 3. Burner 13 comprises a plurality of small jets which are directed against the bottom surface of pipe 10 with sufficient velocity to cause the portion of the pipe above the burner to be deformed inward in the form of a bubble 15 as soon as it has become heated sufficiently to permit flow. The force and heat from the burner is applied until the glass at the bubble becomes soft enough for the force of the hot gas to break it, as indicated in FIGURE 3. When the bubble has burst, the pressure of the flames on the glass is reduced, and the glass from the bubble flows downward under the force of gravity, as indicated by FIGURE 4. The burner remains on for a few seconds to keep the glass hot and to help bead the edges of the opening. Plunger 14 is then moved within the pipe and pressed vertically downward, as indicated in FIGURE 5, to form the opening to its final shape. The plunger has preferably been heated to avoid chilling and hardening of the glass.

It has been found advantageous to construct one burner jet at the center of burner 13 larger than the remaining jets, in order initially to produce a small hole at this point due to the increased heating and increased force exerted by the gas flame from this jet. This initial formation of a small hole prevents the scattering of small particles or filaments of hot glass on the inner surface of tube 10 as the bubble bursts. It has been found especially helpful to maintain a continuous gradient in burner size decreasing radially in all directions from the center of the burner.

In order to form in a round glass pipe a circular opening having a diameter equal to the inner diameter of the pipe, it is necessary that the jets of the burner be arranged in a roughly rectangular pattern which is substantially elongated in an axial direction with respect to the pipe. Thus, the hole which forms after the bursting of the bubble and the reformation of the opening due to the effects of gravity and surface tension, is substantially elliptical in shape. This shape maintains a distribution of glass which permits the plunger to form a circular opening in a substantially horizontal plane.

In order to produce a circular hole having a diameter of 2" in a piece of glass pipe of the same inner diameter, a burner having a plurality of jets spaced at intervals of ⅛" in a roughly rectangular pattern 1¼" x ½" and located approximately ¾" from the pipe may be used. The long dimension of the burner face lies parallel to the pipe axis. The plunger is circular in cross-section and only slightly less than 2" in diameter at its widest point in order to permit insertion into the pipe.

When it is desired to form an elliptical hole, the above procedure is varied only in that the burner pattern is further elongated in the direction of the axis of the pipe, and a plunger having an elliptical cross-section is substituted for plunger 14.

When it is desired to form an opening having its longest dimension substantially less than the diameter of the pipe in which it is formed, for example, a 3" circular opening in a 4" pipe, the burner may be utilized alone without a plunger. In such a case the glass will fall under the force of gravity alone to form a horizontal opening having a shape depending upon the configuration of the burner. Such an opening will permit the joining of pipes having unequal diameters. This sequence of steps is illustrated by FIGURES 1–4.

It will be understood that various burner configurations are required depending upon the diameter and thickness of the pipe and the size and shape of the opening to be formed and that the plunger will vary in cross-section to correspond to the shape of the opening to be formed.

Although gas-oxygen burners have been illustrated as the means for heating the glass and forming it into a bubble, it will be understood that other means such as plasma jet arcs may be employed for heating a localized area of the pipe and propelling a stream of gas against the area to form a bubble. Inasmuch as the flatness of the opening can be controlled solely by the shape of the heated area, means other than a plunger may be utilized for imparting the desired curve to the opening. For exaxple, a rotating expandable reamer may be used for shaping circular and elliptical openings.

We claim:

1. The method of forming a hole in a glass pipe which comprises the steps of supporting said pipe with its axis substantially horizontal, applying heat to soften a portion of the underside of said pipe, projecting against said portion a stream of gas having force sufficient to form a bubble projecting into the interior of said pipe until said bubble bursts to form an opening, and allowing said softened portion defining said opening to be drawn downward by gravity to render said opening suitable for joining with an end of a second piece of glass pipe.

2. The method according to claim 1 in which said softened portion is in the general shape of ellipse having its major axis parallel to the said axis of said pipe.

3. The method of forming a hole in a glass pipe which comprises the steps of supporting said pipe with its axis substnatially horizontal, applying heat to soften a portion of the underside of said pipe, projecting against said portion a stream of gas having force sufficient to form a bubble projecting into the interior of said pipe until said bubble bursts to form an opening, allowing said softened portion defining said opening to be drawn downward by gravity, and subsequently forming said opening into a shape suitable for joining with an end of a second piece of glass pipe.

4. The method according to claim 3 in which said softened portion is in the general shape of an ellipse having its major axis parallel to the said axis of said pipe.

5. The method of forming a hole in a glass pipe which comprises the steps of supporting said pipe with its axis substantially horizontal, directing the flames from a burner against a portion of the underside of said pipe to soften said portion, said flames having sufficient force to cause said softened portion to form a bubble extending into the interior of said pipe and to cause said bubble to burst to form an opening in said softened portion, and allowing said softened portion defining said opening to be drawn downward by the force of gravity to form an opening on the underside of said pipe.

6. The method according to claim 5 in which said burner comprises a plurality of flames forming a substantially rectangular pattern having its long dimension parallel to said axis of said pipe.

7. The method according to claim 6 in which the said flame nearest the center of said burner is larger than the remaining said flames.

8. The method of forming a hole in a glass pipe which comprises the steps of maintaining said pipe with its axis substantially horizontal, directing the flames from a burner against a portion of the underside of said pipe to soften said portion, said flames having sufficient force to cause said softened portion to form a bubble extending into the interior of said pipe and to cause said bubble to burst to form an opening in said softened portion, allowing said softened portion defining said opening to be drawn downward by the force of gravity, and subsequently forming said opening into a desired shape.

9. The method according to claim 8 in which the said flame nearest the center of said burner is larger than the remaining said flames.

10. The method according to claim 9 in which the sizes of said flames decrease with increasing distance from the center of said burner.

11. The method of forming a hole at a given location in a glass object which comprises the steps of supporting said object with said location oriented substantially horizontal, heating said location, directing from below against said heated location a stream of gas having a force sufficient to form a bubble projecting upward until said bubble bursts to form an opening, and allowing said softened portion defining said opening to be drawn downward by gravity to provide an opening on the underside of said glass object.

12. The method of forming a hole at a given location in a glass object which comprises the steps of supporting said object with said location oriented substantially horizontal, heating said location, directing from below against said heated location a stream of gas having a force sufficient to form a bubble projecting upward until said bubble bursts to form an opening, allowing said softened location defining said opening to be drawn downward by gravity to provide an opening on the underside of said glass object, and subsequently forming said opening to a desired shape.

References Cited in the file of this patent

UNITED STATES PATENTS 2,722,086    Mullen _____ Nov. 1, 1955

FOREIGN PATENTS 534,952    Great Britain _____ Mar. 24, 1941